US005165288A

United States Patent [19]

Timtner

[11] Patent Number: 5,165,288

[45] Date of Patent: Nov. 24, 1992

[54] APPARATUS FOR MEASURING TORQUE

[75] Inventor: Karlheinz Timtner, Bad Homburg, Fed. Rep. of Germany

[73] Assignee: Ringspann GmbH, Bad Homburg, Fed. Rep. of Germany

[21] Appl. No.: 686,977

[22] Filed: Apr. 18, 1991

[30] Foreign Application Priority Data

May 7, 1990 [DE] Fed. Rep. of Germany ....... 4014521

[51] Int. Cl.[5] ............................................ G01L 3/04

[52] U.S. Cl. ......................... 73/862.321; 73/862.325

[58] Field of Search ........... 73/862.32, 862.33, 862.34, 73/862.35, 862.19, 862.21, 862.22, 862.23, 862.24, 862.27, 862.28, 862.29, 862.31

[56] References Cited

U.S. PATENT DOCUMENTS 2,173,039 9/1939 Muir ................................ 73/862.32

4,809,557 3/1989 Maurer et al. .................. 73/862.32

5,058,438 10/1991 Timtner ........................... 73/862.32

*Primary Examiner*—Donald O. Woodiel

*Attorney, Agent, or Firm*—Edwin E. Greigg; Ronald E. Greigg

[57] ABSTRACT

The invention relates to an apparatus for measuring a torque, conducted through a rotatable machine element, by means of fork-shaped transmitter levers including tines which are connected with two parts which, when a torque is transmitted, resiliently rotate in relation to each other, and the fork handle of which is hinged on a transmitter ring, so that the relative rotation between the two previously mentioned parts generates an increased axial movement of the transmitter ring, which is detected as a measurement of the torque. To prevent an overload on the measuring device and breakage of its components in case of impermissibly high torque shocks, stops are provided which limit the relative rotation of the two parts which rotate in relation to each other during the transmission of torque to a value which corresponds to the maximally permissible stress on the material of the measurement apparatus.

36 Claims, 2 Drawing Sheets

APPARATUS FOR MEASURING TORQUE

BACKGROUND OF THE INVENTION

The invention relates to an apparatus for measuring a torque, conducted through a rotatable machine element, by means of two parts which are connected with this machine element at an axial and/or radial distance. When a torque is conducted through the machine element, the two parts rotate in relation to each other, where the relative rotation between these two parts, which takes place in a peripheral direction, is translated by means of a plurality of resiliently hinged levers distributed over the periphery into an amplified axial movement of a transmitter ring. This axial movement is measured as the value for the transmitted torque. The levers are fork-shaped and hinged by the two tines of the fork on one or the other rotatable part, while the fork handle is hinged on the transmitter ring.

OBJECT AND SUMMARY OF THE INVENTION

A measuring device of this type is known from Figs. 14 to 16 of German Published, Non-Examined Patent Application DE-OS 37 08 103. It is distinguished by a high degree of measuring accuracy and dependability.

An improvement of this measuring device is described in German Patent Application P 39 07 707.1; now co-pending U.S. patent application Ser. No. 482,582 filed Feb. 21, 1990. In this case the fork-shaped levers, together with the parts rotating in relation to each other and preferably also together with the transmitter ring, are combined into a one-piece cast part. Because of this the production costs and particularly the assembly costs are considerably reduced.

It is an object of the present invention to perfect the described measuring device further. It is mainly intended that it remains fully functional, particularly during short, excessive torque shocks and continues to assure continued torque transmission.

This object is attained in accordance with the invention in that the parts which are rotatable in relation to each other are limited by stops which come to rest against each other to fix a relative rotation which maximally corresponds to the permissible material stress of the measuring apparatus, particularly its resilient elements.

It is assured by means of these steps that in particular the sensitive parts of the measuring apparatus, namely the fork-shaped levers and the resilient connection between the two parts which are rotatable in relation to each, do not suffer excessively great deformation, because the dangerous load shocks are absorbed by the said stops. The measuring device thus remains capable of use during continued operation without impairment of the accuracy of measurement, once the torque to be transmitted is again within normal limits.

In the same way breaking of these sensitive parts is made impossible by these steps. Thus, the transmission of the torque through the measuring remains assured. This is of particularly greatest importance when used in the propulsion systems of motor vehicles or ships.

Several choices offer themselves to one skilled in the art for the structural design of the said stops. It may be practical to form the stops on the one hand by means of a projection connected with one of the two parts which are rotatable in relation to each other and on the other hand by an opening assigned to this projection. In this case, in accordance with the permissible relative rotation, the opening has slightly larger dimensions than the projection, so that there is a gap in the peripheral direction between both parts, which corresponds to the permissible expansion reserve of the sensitive parts of the measuring device.

If the two parts which are rotatable in relation to each other are radially disposed in relation to each other in the form of an inner or an outer part, it is particularly advantageous if the inner and outer parts are formed from a common, disk-shaped machine part by a plurality of slits extending over the peripheral sections of the machine part. In this case the desired stops are obtained by means of peripheral surfaces of the inner or outer parts which are located opposite each other on both sides of the slits. In this way no additional components are required for the stops.

A particularly space-saving construction is the result if the slits each extend between the fastening points of the tines of the fork of a fork-shaped lever, and if the tines of the fork are located behind each other in the axial direction of the measuring device and are connected with radial surfaces of the inner or outer parts which are oriented in the same direction in relation to each other. Because of this, the connecting parts, which up to now were required for bridging the radial distance of the tines of the fork, can be omitted.

In particular in cases, where for production reasons the width, measured in the peripheral direction, of the slit between the inner and the outer part is greater than the maximally permissible peripheral distance between these parts, it is recommended to introduce an insertion band or a plurality of spacers into the slit in order to set the distance in the peripheral direction between the stop surfaces exactly corresponding to the maximally permissible peripheral distance between the inner and the outer part.

Another improvement of the invention is that a damper element is disposed between the said stops. In this way the undesirable torque shocks are transmitted in a moderated way and the subsequent drive system is protected.

Finally, it has been proven to be advantageous to provide the housing of the measurement device in a way where an axial, circular groove is provided on the machine element having the two parts which rotate in relation to each other, in which the measuring device is installed. This choice offers itself particularly in connection with toothed wheels and similar disk-shaped machine elements having a large cross section of the material in the axial direction in the area between them which is not required for the torque transmission. It is possible in this way to gain considerable space for installation in the axial direction, or the toothed wheel with the measuring device does not require more axial installation length than the toothed wheel without a measuring device.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
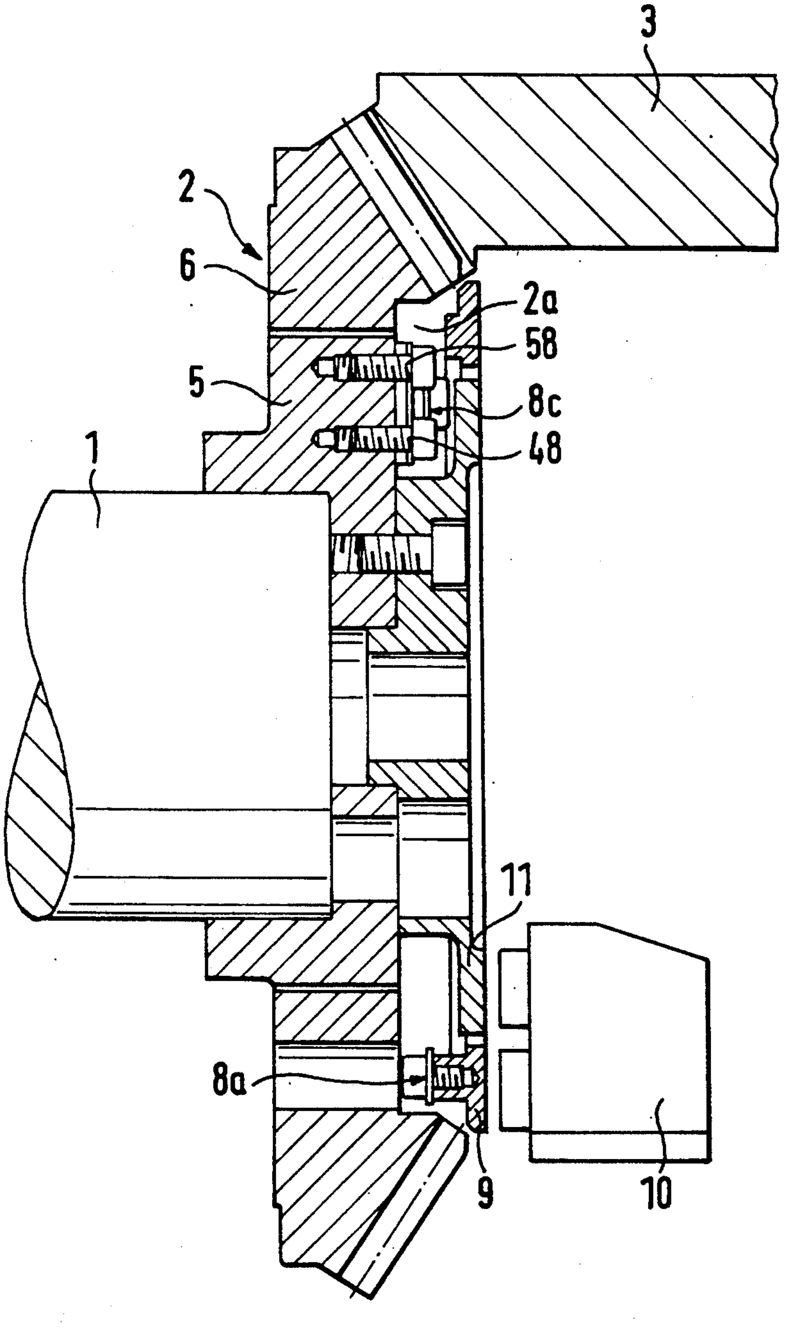
FIG. 1 is an axial section through the measuring device.

In FIG. 1 it should be assumed that the torque to be measured arrives via a shaft 1 and is intended to be transferred from this shaft to a toothed wheel 2 which, in turn, transmits the torque to an appropriate toothed wheel 3. In this exemplary embodiment the torque measuring device is installed in the toothed wheel 2. It is of course also possible to make this installation in any other machine element.

Figure 2:
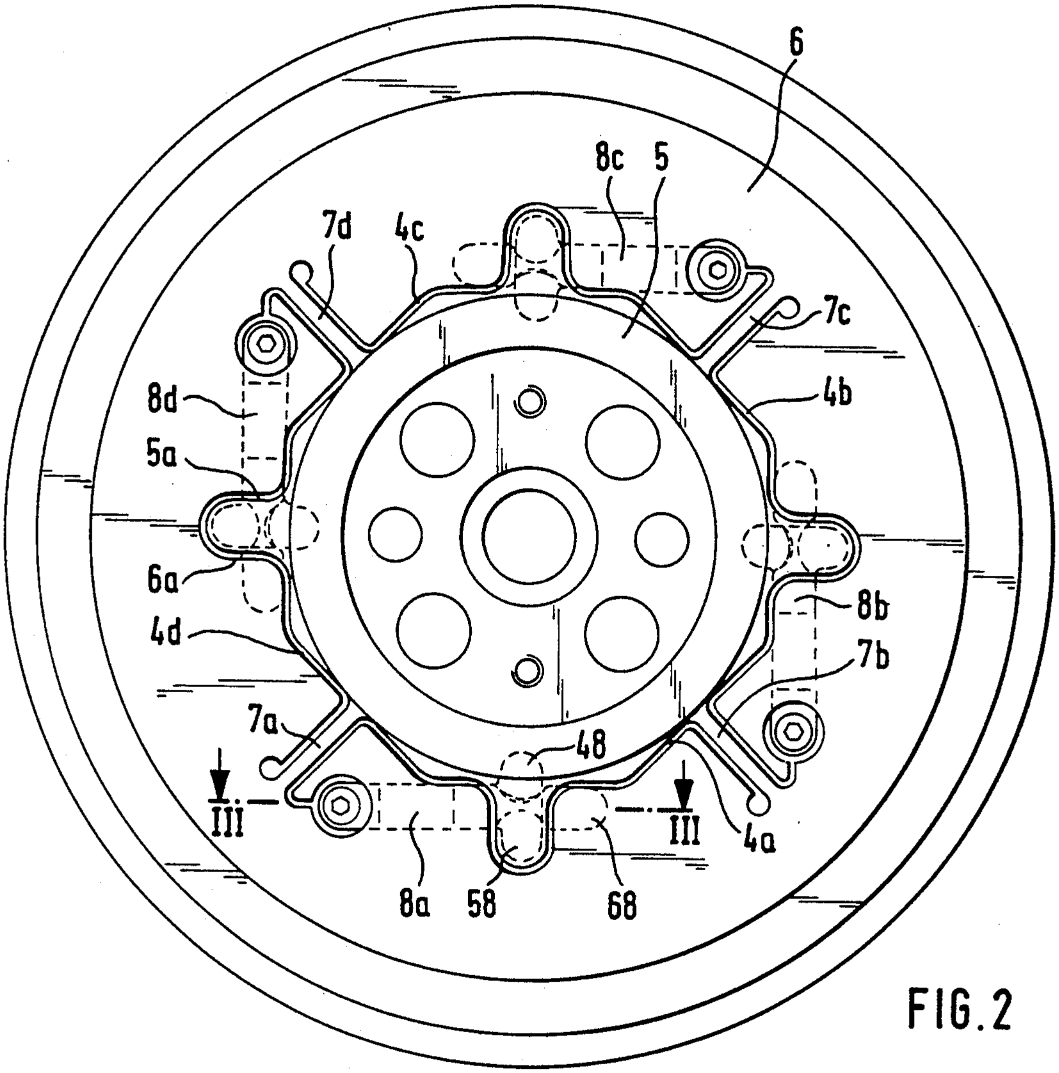
FIG. 2 is a view of the measuring device in an axial direction.
Figure 3:
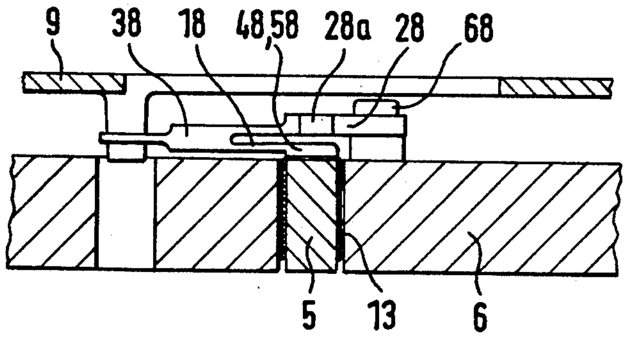
FIG. 3 is a section along the line III—III of FIG. 2.

As shown in FIG. 2, the toothed wheel 2 is divided into an inner part 5 and an outer part 6 by a plurality of slits 4*a*, 4*b*, 4*c* and 4*d*, which extend over consecutive peripheral areas. The inner and outer parts 5 and 6 are connected by means of spoke-shaped intermediate elements 7*a*, 7*b*, 7*c* and 7*d* in such a way, that in the course of torque transfer a desired relative movement between the inner and outer parts is generated. To this end the said spokes 7*a* to 7*d* extend in the exemplary embodiment approximately radially and they are formed by means of an appropriate placement of the slits 4*a* to 4*d*. The slits can be made, for example, by eroding or in any other way. Also, the spoke-shaped intermediate elements 7*a* to 7*d* need not extend exactly radially. It is only essential that resilient bridges are created in the peripheral direction between the inner and outer parts 5 and 6, which generate the desired relative rotation between the two parts during the torque transmission.

As further indicated by the drawing figures, the inner part and the outer part are connected with each other by means of a plurality of fork-like levers 8*a* to 8*d*, which are consecutive in the peripheral direction and are oriented approximately tangentially. Each one of these fork-shaped levers is fixed with one of its tines 18 on the inner part 5 and with its other tine 28 on the outer part 6. Looking in the axial direction, the tines of the fork are located behind one another and partially overlap. At their end opposite the fastening points, they combine into a fork handle 38, which continues to extend in the prolongation of the fork tines. The free end of the fork handle 38 is connected with a transmitter ring 9, which is axially displaced in a known manner by the fork-shaped levers as a function of the size and direction of the relative rotation between the inner and outer parts 5 and 6.

So that the fork-shaped levers do not cross during this displacement movement, a joint 28*a*, acting in the radial direction, is provided on the tine 28. For the same reason the fork handle 38 is resiliently hinged in the axial direction on the transmitter ring 9.

Regarding the further details of the displacement mechanism, reference is made in full to German Letters Patent DE-PS 37 08 103.

It is essential that the slits 4*a* to 4*d* extend to form the parts 5 and 6, which are resiliently connected but rotatable in relation to each other, in such a way that the peripheral surfaces of the inner and outer parts, which border on them and which are located opposite each other, at least partially contact each other during a relative rotation between the two parts and in this way act as stops 5*a*, 6*a* for limiting the relative movement. The width of the slit which determines this therefore is adapted to the maximally permissible stress on the material of the measuring apparatus, in particular the spoke-shaped intermediate elements 7*a* to 7*d* and the fork-shaped levers 8*a* to 8*d*. By means of this it is not only possible to prevent excess stress on the material, but even with breaking of the spoke-shaped intermediate elements or the fork-shaped levers a torque transmission is still possible, because a positive engagement between the inner part 5 and the outer part 6 is maintained on account of the course of the slits 4*a* to 4*d*.

It is furthermore essential, that the slits 4*a* to 4*d* each extend between the fastening points of the tines 18 and 28 on the inner part 5 or the outer part 6. Because of this it is possible to mount the tines of the fork on surfaces of the inner and outer part which are oriented in the same direction, and in particular without additional radial bridging elements.

In this connection it is particularly advantageous if the one tine—in the exemplary embodiment the tine 18—is connected via two fastening points 48 or 58, which are radially offset towards the inside or the outside, with the inner part 5 or the outer part 6, and if these two fastening points are located in the area of the joint 28*a* of the other tine of the fork, so that they are easily accessible. In contrast thereto, the other tine 28 has been extended on its free end, so that its fastening point 68 is tangentially offset in respect to the fastening points 48 and 58. This selection of the fastening positions considerably eases the mounting of the fork-shaped levers 8*a* to 8*d*.

The disposition of the sensor 10 to determine the axial displacement, proportional to the torque, of the transmitter ring 9 is shown in FIG. 1. In this case the sensor 10 is in the form of a differential transmitter, which detects the axial displacement of the transmitter ring 9 in relation to a reference ring 11, which is rigidly connected with the measuring device. In this way axial displacements which occur, for example, because of heat expansion, and which necessarily also affect the axial position of the transmitter ring, have no effect on the measurement result. There is also no risk of errors if the sensor 10 is mounted on housing parts the axial position of which in relation to the direction of measurement does not remain absolutely the same.

Finally, FIG. 1 shows the space-saving installation of the measuring device, in that the wheel body of the toothed wheel 2 has a groove 2*a*, into which the measuring device fits to a large extent.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. An apparatus for measuring a torque, conducted through a rotatable machine element (2), by means of two parts (5, 6) which are connected with this machine element at an axial and/or radial distance and which, when a torque is conducted through the machine element (2), turn in relation to each other, where the relative rotation between these two parts (5, 6), which takes place in a peripheral direction, is translated by means of a plurality of resiliently hinged levers (8*a* to 8*d*) distributed over the periphery into an amplified axial movement of a transmitter ring (9) connected thereto and this axial movement is measured as a value for the transmitted torque, the levers (8*a* to 8*d*) being fork-shaped and hinged by the two tines (18, 28) of the fork on one or the other rotatable part (5, 6), while the fork handle (38) is hinged on the transmitter ring (9), in which the parts (5, 6) which are rotatable in relation to each other are limited by stops (5*a*, 6*a*), which come to rest against each other after a relative rotation which maximally corresponds to a permissible material stress of the measuring apparatus.

2. An apparatus in accordance with claim 1, where the parts (5, 6) which are rotatable in relation to each other are radially disposed relative to each other as inner and outer parts, in which the inner and outer parts (5 or 6) are formed from a common, disk-shaped machine part (2) by a plurality of slits (4*a* to 4*d*) extending over the peripheral sections of the machine part.

3. An apparatus in accordance with claim 2, in which the stops are formed by peripheral surfaces (5*a*, 6*a*) of the inner part (5) and the outer part (6) which are located opposite each other on both sides of the slits (4*a* to 4*d*).

4. An apparatus in accordance with claim 3, in which the tines (18, 28) of the fork are located behind each other in an axial direction of the measuring device and are connected with radial surfaces of the inner or outer parts (5, 6) which are oriented in the same direction in relation to each other.

5. An apparatus in accordance with claim 3, in which the slits (4*a* to 4*d*) each extend between the fastening points (48, 58) on the one side and point (68) on the other side of the tines (18 or 28) of the fork of each of the fork-shaped levers (8*a* to 8*d*).

6. An apparatus in accordance with claim 5, in which the tines (18, 28) of the fork are located behind each other in an axial direction of the measuring device and are connected with radial surfaces of the inner or outer parts (5, 6) which are oriented in the same direction in relation to each other.

7. An apparatus in accordance with claim 3, in which the stops are formed by means of a projection connected with one of the two rotatable parts which are rotatable in relation to each other, and by an opening assigned to this projection which, in accordance with a permissible relative rotation, has slightly larger dimensions than the projection, so that the projection corresponds with its assigned opening while forming a gap.

8. An apparatus in accordance with claim 3, in which a damper element, a damping layer or the like is disposed between the stops (5*a*, 6*a*).

9. An apparatus in accordance with claim 3, in which at least one insertion band (13), spacers or the like are disposed between the stops (5*a*, 6*a*) to set a defined distance between the inner and outer parts (5, 6) in the peripheral direction.

10. An apparatus in accordance with claim 3, in which the measuring device is housed in an annular groove (2*a*) of the inner and outer parts (5, 6).

11. An apparatus in accordance with claim 2, in which the slits (4*a* 4*d*) each extend between the fastening points (48, 58) on the one side and point (68) on the other side of the tines (18 or 28) of the fork of each of the fork-shaped levers (8*a* to 8*d*).

12. An apparatus in accordance with claim 11, in which the tines (18, 28) of the fork are located behind each other in an axial direction of the measuring device and are connected with radial surfaces of the inner or outer parts (5, 6) which are oriented in the same direction in relation to each other.

13. An apparatus in accordance with claim 11, in which the stops are formed by means of a projection connected with one of the two rotatable parts which are rotatable in relation to each other, and by an opening assigned to this projection which, in accordance with a permissible relative rotation, has slightly larger dimensions than the projection, so that the projection corresponds with its assigned opening while forming a gap.

14. An apparatus in accordance with claim 11, in which a damper element, a damping layer or the like is disposed between the stops (5*a*, 6*a*).

15. An apparatus in accordance with claim 11, in which at least one insertion band (13), spacers or the like are disposed between the stops (5*a*, 6*a*) to set a defined distance between the inner and outer parts (5, 6) in the peripheral direction.

16. An apparatus in accordance with claim 11, in which the measuring device is housed in an annular groove (2*a*) of the inner and outer parts (5, 6).

17. An apparatus in accordance with claim 2, in which the tines (18, 28) of the fork are located behind each other in an axial direction of the measuring device and are connected with radial surfaces of the inner or outer parts (5, 6) which are oriented in the same direction in relation to each other.

18. An apparatus in accordance with claim 2, in which the stops are formed by means of a projection connected with one of the two rotatable parts which are rotatable in relation to each other, and by an opening assigned to this projection which, in accordance with a permissible relative rotation, has slightly larger dimensions than the projection, so that the projection corresponds with its assigned opening while forming a gap.

19. An apparatus in accordance with claim 2, in which a damper element, a damping layer or the like is disposed between the stops (5*a*, 6*a*).

20. An apparatus in accordance with claim 2, in which at least one insertion band (13), spacers or the like are disposed between the stops (5*a*, 6*a*) to set a defined distance between the inner and outer parts (5, 6) in the peripheral direction.

21. An apparatus in accordance with claim 2, in which the measuring device is housed in an annular groove (2*a*) of the inner and outer parts (5, 6).

22. An apparatus in accordance with claim 1, in which the tines (18, 28) of the fork are located behind each other in an axial direction of the measuring device and are connected with radial surfaces of the inner or outer parts (5, 6) which are oriented in the same direction in relation to each other.

23. An apparatus in accordance with claim 22, in which the stops are formed by means of a projection connected with one of the two rotatable parts which are rotatable in relation to each other, and by an opening assigned to this projection which, in accordance with a permissible relative rotation, has slightly larger dimensions than the projection, so that the projection corresponds with its assigned opening while forming a gap.

24. An apparatus in accordance with claim 22, in which a damper element, a damping layer or the like is disposed between the stops (5*a*, 6*a*).

25. An apparatus in accordance with claim 22, in which at least one insertion band (13), spacers or the like are disposed between the stops (5*a*, 6*a*) to set a defined distance between the inner and outer parts (5, 6) in the peripheral direction.

26. An apparatus in accordance with claim 22, in which the measuring device is housed in an annular groove (2*a*) of the inner and outer parts (5, 6).

27. An apparatus in accordance with claim 1, in which the stops are formed by means of a projection connected with one of the two rotatable parts which are rotatable in relation to each other, and by an opening assigned to this projection which, in accordance with a permissible relative rotation, has slightly larger dimensions than the projection, so that the projection corresponds with its assigned opening while forming a gap.

28. An apparatus in accordance with claim 27, in which a damper element, a dampening layer or the like is disposed between the stops (5*a*, 6*a*).

29. An apparatus in accordance with claim 27, in which at least one insertion band (13), spacers or the like are disposed between the stops (5*a*, 6*a*) to set a defined distance between the inner and outer parts (5, 6) in the peripheral direction.

30. An apparatus in accordance with claim 27, in which the measuring device is housed in an annular groove (2*a*) of the inner and outer parts (5, 6).

31. An apparatus in accordance with claim 1, in which a damper element, a damping layer or the like is disposed between the stops (5*a*, 6*a*).

32. An apparatus in accordance with claim 31, in which at least one insertion band (13), spacers or the like are disposed between the stops (5*a*, 6*a*) to set a defined distance between the inner and outer parts (5, 6) in the peripheral direction.

33. An apparatus in accordance with claim 31, in which the measuring device is housed in an annular groove (2*a*) of the inner and outer parts (5, 6).

34. An apparatus in accordance with claim 1, in which at least one insertion band (13), spacers or the like are disposed between the stops (5*a*, 6*a*) to set a defined distance between the inner and outer parts (5, 6) in the peripheral direction.

35. An apparatus in accordance with claim 34, in which the measuring device is housed in an annular groove (2*a*) of the inner and outer parts (5, 6).

36. An apparatus in accordance with claim 1, in which the measuring device is housed in an annular groove (2*a*) of the inner and outer parts (5, 6).

* * * * *

UNITED STATES PATENT AND TRADEMARK OFFICE
CERTIFICATE OF CORRECTION

PATENT NO. : 5,165,288
DATED : November 24, 1992
INVENTOR(S) : Karlheinz Timtner It is certified that error appears in the above-identified patent and that said Letters Patent is hereby corrected as shown below:

Column 1, line 59 should read:
--of the torque through the measuring device remains assured.--

Signed and Sealed this

Twenty-first Day of June, 1994

Attest:

Bruce Lehman

BRUCE LEHMAN

*Attesting Officer*

*Commissioner of Patents and Trademarks*